ical-grade

(12) United States Patent
Harris et al.

(10) Patent No.: US 11,112,034 B2
(45) Date of Patent: Sep. 7, 2021

(54) CABLE KEEPER

(71) Applicant: GlobalMedia Group, LLC, Scottsdale, AZ (US)

(72) Inventors: Michael D. Harris, Scottsdale, AZ (US); Jeremy Troutman, Scottsdale, AZ (US); Joel E. Barthelemy, Paradise Valley, AZ (US)

(73) Assignee: GlobalMedia Group, LLC, Scottsdale, AZ (US)

( * ) Notice: Subject to any disclaimer, the term of this patent is extended or adjusted under 35 U.S.C. 154(b) by 99 days.

(21) Appl. No.: 16/444,818

(22) Filed: Jun. 18, 2019

(65) Prior Publication Data

US 2020/0400249 A1   Dec. 24, 2020

(51) Int. Cl.
   *F16L 3/10*   (2006.01)
   *H02G 3/32*   (2006.01)
   *H01R 13/639*   (2006.01)
   *H01R 25/00*   (2006.01)

(52) U.S. Cl.
   CPC .......... *F16L 3/1033* (2013.01); *H01R 13/639* (2013.01); *H01R 25/003* (2013.01); *H02G 3/32* (2013.01)

(58) Field of Classification Search
   CPC .............. H01R 13/5812; H01R 13/639; H02G 15/007; H02G 15/16; H02G 3/16; F16L 3/1033
   USPC ........................................................ 439/584
   See application file for complete search history.

(56) References Cited

U.S. PATENT DOCUMENTS

| | | | | |
|---|---|---|---|---|
| 4,191,443 A | * | 3/1980 | Doyle | H01R 13/506 439/462 |
| 7,766,688 B2 | * | 8/2010 | Ferrus | H01R 13/501 439/417 |
| 7,867,002 B1 | * | 1/2011 | Lin | H01R 13/5205 439/292 |
| 8,241,052 B2 | * | 8/2012 | Mulot | H01R 13/639 439/299 |
| 8,348,692 B2 | * | 1/2013 | Montena | H01R 13/622 439/359 |
| 8,465,321 B2 | * | 6/2013 | Montena | H01R 24/28 439/579 |
| 8,992,263 B2 | * | 3/2015 | Fallon | H01R 13/748 439/660 |
| 9,075,205 B2 | * | 7/2015 | Pepe | G02B 6/3825 |
| 9,444,206 B2 | * | 9/2016 | Kitanishi | H01R 33/94 |
| 9,833,858 B2 | * | 12/2017 | Sammons | H01R 13/46 |
| 10,270,209 B2 | * | 4/2019 | Resendez | H01R 13/508 |
| 10,644,491 B2 | * | 5/2020 | Korcz | H02G 3/086 |
| 2011/0151707 A1 | * | 6/2011 | Umetsu | B60L 50/51 439/391 |

* cited by examiner

*Primary Examiner* — Bradley Duckworth
(74) *Attorney, Agent, or Firm* — Snell & Wilmer L.L.P.

(57) ABSTRACT

A cable retention assembly comprising a housing defining a cable aperture extending axially through the housing and a retention aperture extending from an outside surface of the housing through the housing and opening into the cable aperture. A clamping mechanism may be disposed within the retention aperture. A hook may have an insert and a lip. The hook may be coupled to the housing via the clamping mechanism. The cable retention assembly according to the present invention can be used with all known cables including, but not limited to, USB cables.

16 Claims, 6 Drawing Sheets

CABLE KEEPER

FIELD

The present disclosure generally relates to a retention device for various cables.

BACKGROUND

Peripheral devices are commonly connected to computers, hubs, connectors, and/or various devices via a plug being inserted into a port. Typical plug and port connections are loose connections and may result in a cable being pulled out or disconnected by a small force in the axial direction. Thus, a cable retention device to retain a plug in a corresponding port may be desirable.

SUMMARY

A cable retention assembly is disclosed herein. The cable retention system comprises: a housing defining a cable aperture extending axially through the housing and a retention aperture extending from an outside surface of the housing through the housing and opening into the cable aperture; a clamping mechanism disposed within the retention aperture; and a hook having an insert and a lip, the hook coupled to the housing via the clamping mechanism.

In various embodiments, the cable clamping mechanism may further comprise a fastener, wherein a portion of the fastener extends into a portion of the cable aperture. The housing may further define a groove extending axially through the housing adjacent to the cable aperture. The fastener may be threadingly coupled to the insert and mate the hook to a hook mating surface of the groove. The lip of the hook may extend axially aft of the housing. The hook mating surface may define a plane. A centerline of the retention aperture may be substantially perpendicular to the plane. The cable retention assembly may be coupled to a connector housing via the hook.

A cable retention system is also disclosed herein. The cable retention system comprises: a connector comprising a connector housing and a plug port, the connector housing defining a first cable aperture extending axially through the connector housing and a hook recess extending outward from a surface of the first cable aperture; and a cable retention assembly coupled to the connector, the cable retention assembly comprising: a housing defining a second cable aperture extending axially through the housing and a retention aperture extending from an outside surface of the housing through the housing and opening into the second cable aperture; a fastener disposed within the retention aperture; and a hook having an insert and a lip, the hook coupled to the housing via the fastener.

In various embodiments, the lip of the hook may engage the hook recess. The cable retention system may further comprise a catch-and-release mechanism disposed within the connector housing, the catch-and-release mechanism comprising a button and a spring. The connector housing may further comprise a spring recess disposed axially adjacent to the hook recess, the spring coupled to the spring recess and an outer surface of the button. The connector housing may further comprise a button receptacle disposed opposite the spring recess, the button extending through the button receptacle. A portion of the button may extend outside the connector housing. A portion of the fastener may extend into a portion of the second cable aperture. The housing may further define a groove that extends axially through the housing adjacent to the second cable aperture. The fastener may be threadingly coupled to the insert and mate the hook to a hook mating surface of the groove. The first cable aperture and the second cable aperture may be co-axial. The cable retention system may further comprise a cable having a plug and extending through the first cable aperture and the second cable aperture, the plug coupled to the plug port, and the cable retained by the fastener exerting a force on a portion of the cable.

A cable retention system is also disclosed herein. The cable retention system comprises: a cable retention assembly comprising: a housing defining a first plurality of cable apertures and a plurality of retention apertures, each cable aperture in the first plurality of cable apertures extending axially through the housing, and each retention aperture in the plurality of retention apertures extending from an outside surface of the housing through the housing and opening into a respective cable aperture in the plurality of cable apertures; a plurality of fasteners, each fastener in the plurality of fasteners disposed within a respective retention aperture in the plurality of retention apertures; and a plurality of hooks, each hook in the plurality of hooks having an insert and a lip, and each hook in the plurality of hooks coupled to the housing via a respective fastener in the plurality of fasteners.

In various embodiments, the cable retention system may further comprise a hub defining a second plurality of cable apertures, each cable aperture in the second plurality of cable apertures aligned with a respective cable aperture in the first plurality of cable apertures of the housing. The cable retention system may further comprise a plurality of hook recesses, each hook recess in the plurality of hook recesses extending outward from a respective cable aperture surface from a respective cable aperture in the second plurality of cable apertures. The lip of each hook in the plurality of hooks may engage a respective hook recess. Each cable aperture in the first plurality of cable apertures may be disposed adjacent to an adjacent cable aperture in the first plurality of cable apertures. A portion of each fastener in the plurality of fasteners may extend into a portion of each respective cable aperture in the first plurality of cable apertures.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Systems, methods, and devices are disclosed herein for retaining a cable within a respective port. As used herein, a "cable" may refer to any device capable of transferring electrical signals from one device to another. For, example and without limitation, a cable may refer to a High Definition Multimedia (HDMI) cable, display ports, Serial Advanced Technology Attachment (SATA) cable, a Universal Serial Bus (USB) cable, a firewall Institute of Electrical and Electronics Engineers (IEEE) cable, an audio jack, various adapters, such as USB to Ethernet, Digital Visual Interface (DGI) to High Definition Multimedia Interface (HDMI), Thunderbolt to DVI, any type of a connector, or any other suitable device.

Figure 1A:
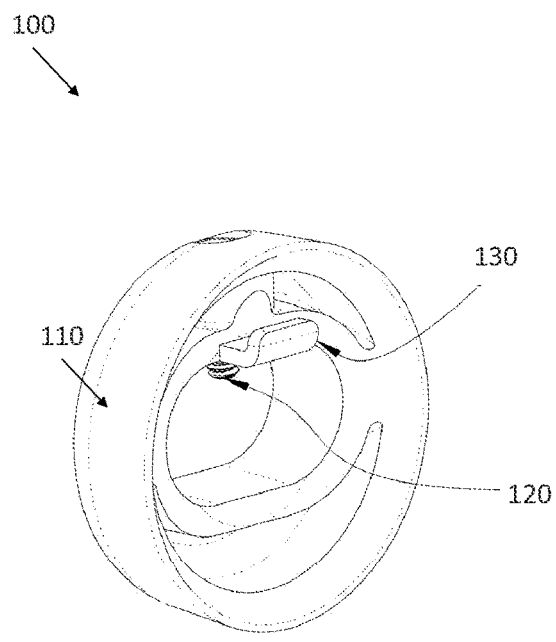
FIGS. 1A and 1B illustrate a perspective view of a cable retention assembly, in accordance with various embodiments.
Figure 1B:
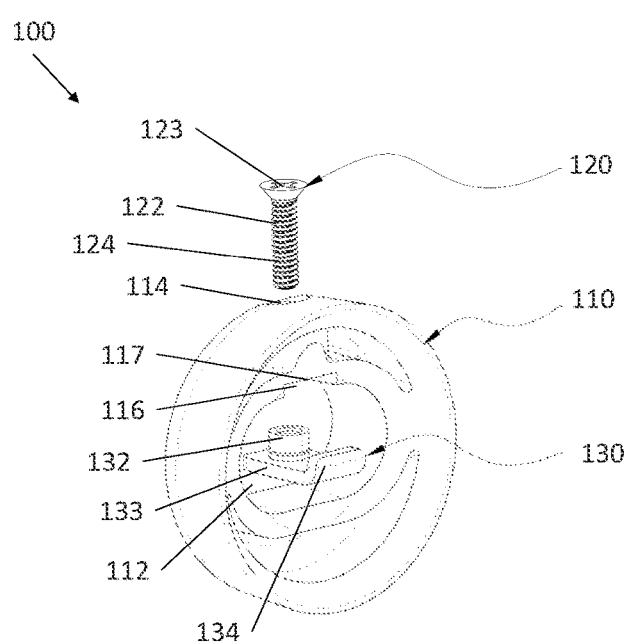

With reference to FIGS. 1A and 1B, a perspective view of a cable retention assembly 100, in accordance with various embodiments, is depicted. The cable retention assembly 100 comprises a housing 110, a clamping mechanism 120, and a hook 130. The clamping mechanism 120 may be disposed within the housing 110. In various embodiments, the clamping mechanism 120 may be integral to the housing 110. When in use, the clamping mechanism 120 secures a plug protector of a cable within the housing 110 by applying a compressive force to the plug protector of a cable. In various embodiments, the hook 130 is coupled to the housing 110 via the clamping mechanism 120. In various embodiments, the hook is integral to the housing 110.

In various embodiments, the housing 110 comprises a first cable aperture 112, a retention aperture 114, and a groove 116. The first cable aperture 112 is an aperture extending axially through the housing 110. In various embodiments, the first cable aperture 112 may have a racetrack cross-section, a circular cross section, a quadrilateral cross section, or any cross-section that is complimentary to a plug protector portion of a cable. The housing 110 may further define a retention aperture 114 extending from an outer surface of the housing 110 through the housing 110 and opening into the first cable aperture 112. The housing 110 may further define a groove 116 disposed adjacent to the first cable aperture 112 and extending axially through the housing 110 from an aft surface to a forward surface. The groove 116 defines a hook mating surface 117. In various embodiments, the retention aperture 114 has a centerline that is substantially perpendicular with a plane defined by the hook mating surface 117. In various embodiments, substantially perpendicular refers to +/−10°.

In various embodiments, the clamping mechanism 120 comprises a fastener 122, such as a bolt, a screw, a rivet, or any fastener known in the art. In various embodiments, the fastener 122 is disposed in the retention aperture 114 of the housing 110. When in use, the fastener 122 may extend through the retention aperture 114 and into the first cable aperture 112. The fastener 122 has a fastener head 123 and a male threaded portion 124. The fastener head 123 may interface an outer surface of housing 110 having a complimentary shape the fastener head 123. The fastener head 123 may have a frustoconical interface surface, flat interface surface, or the like.

In various embodiments, the hook 130 comprises an insert 132, a lip 134, and an elongated body 133 extending from the insert 132 to the lip 134. The insert 132 may interface with a portion of the hook mating surface 117 and the retention aperture 114. The insert 132 may have an internal aperture that is coaxial with the retention aperture 114. The insert 132 may have a female thread portion that interfaces with the male threaded portion 124 of the fastener 122. The fastener 122 threadingly engages the insert 132 and couples the hook 130 and the fastener 122 to the housing 110.

Figure 2:
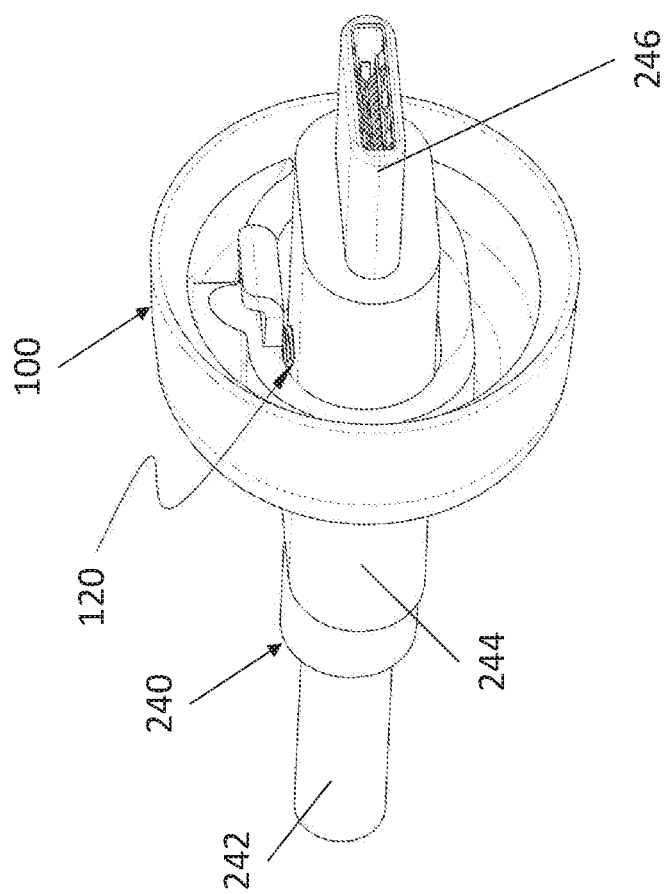
FIG. 2 illustrates a perspective view of a cable retention assembly in use, in accordance with various embodiments.

Referring now to FIG. 2, a perspective view of a cable retention assembly in use, in accordance with various embodiments, is depicted. A cable retention assembly 100 is configured to receive a cable 240. A cable 240 comprises a jacket 242 used to protect wires internal to the jacket, a plug 246, and a plug protector 244. The plug protector 244 surrounds the plug 246 and may protect the plug 246 from bending forces and/or tension/compressive forces. When in use, the clamping mechanism 120 from the cable retention assembly 100 provides a compressive force to an outer surface of the plug protector 244. The compressive force at least partially secures the cable 240 at the plug protector 244 location. Referring now to FIGS. 1A, 1B, and 2, the plug protector 244 has a complimentary shape to the first cable aperture 112. The complimentary shape may ensure that the plug protector 244 can slide through the first cable aperture 112. The fastener 122 may be fastened by any method commonly known in the art to compress a bottom end of the fastener 122 into the outer surface of the plug protector 244. In various embodiments, a centerline of the fastener 122 may be substantially perpendicular to the outer surface of the plug protector 244 that the fastener 122 interfaces with. This may allow for a more secure coupling of the plug protector 244 to the cable retention assembly 100.

Figure 3:
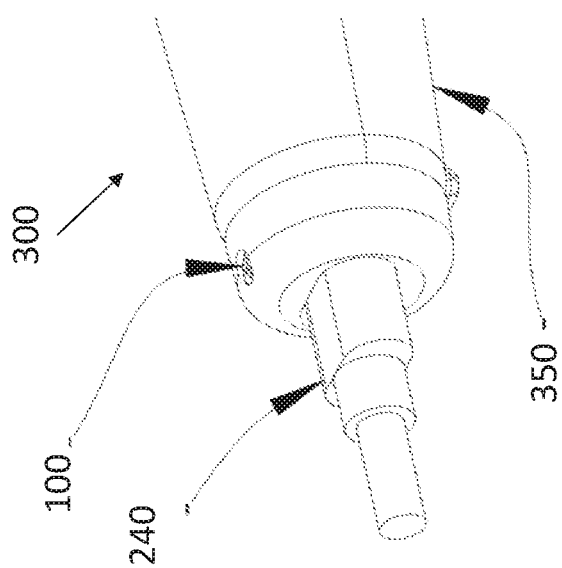
FIG. 3 illustrates a perspective view of a cable retention system, in accordance with various embodiments.

Referring now to FIG. 3, a perspective view of a cable retention system 300, in accordance with various embodiments, is depicted. The cable retention system 300 comprises a connector 350 and a cable retention assembly 100. The cable retention system 300 may further comprise a cable 240. In various embodiments, the cable retention assembly 100 is coupled to the connector 350. The cable 240 interfaces with the connector housing 351 and is at least partially secured by the cable retention assembly 100 as described above.

Figure 4:
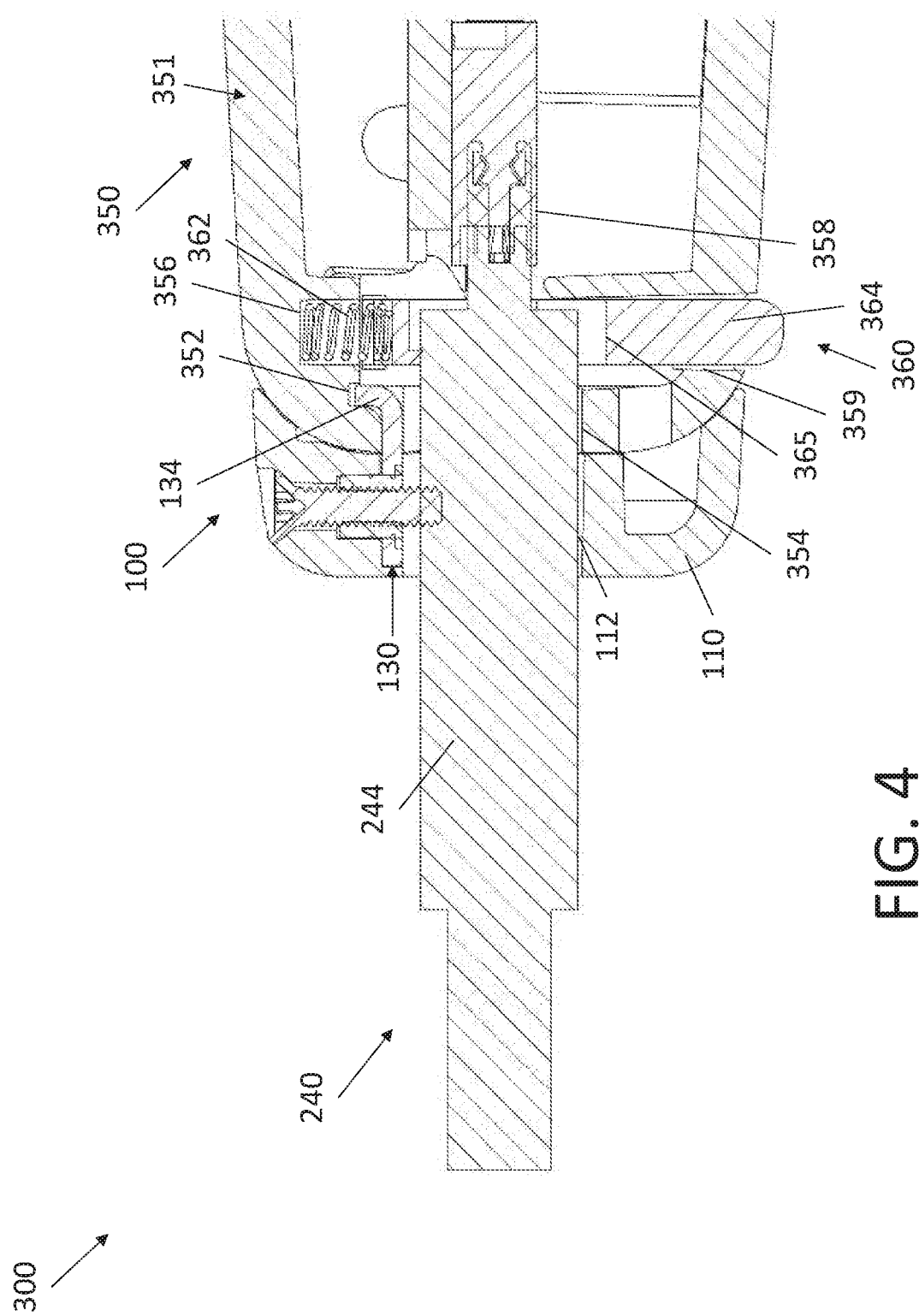
FIG. 4 illustrates a cross-section view of a cable retention system, in accordance with various embodiments.

Referring now to FIG. 4, a cross-section view of a cable retention system 300, in accordance with various embodiments, is depicted. The cable retention system 300 comprises a cable retention assembly 100 and a connector 350. The connector 350 comprises a connector housing 351 and a plug port 358. The connector housing 351 defines a second cable aperture 354. The second cable aperture 354 may be co-axial with the first cable aperture 112 of the housing 110 of the cable retention assembly 100. The connector housing 351 further defines a hook recess 352 extending from a surface of the second cable aperture 354 outward into the connector housing 351. In various embodiments, the lip 134 of the hook 130 engages the hook recess 352 and couples the cable retention assembly 100 to the connector 350.

In various embodiments, the connector 350 further comprises a push and release mechanism 360. The push and release mechanism 360 comprises a spring 362 and a button 364. In various embodiments, the button 364 is disposed within a button receptacle 359 of the connector housing 351. In a resting state, the button 364 extends outside of the connector housing 351. The button comprises a third cable aperture 365. The third cable aperture 365 may be co-axial with the first cable aperture 112 of the housing 110 and the second cable aperture 354 of the connector housing 351. The spring 362 is disposed within a spring recess 356 of connector housing 351. The spring recess 356 may be axially adjacent to the hook recess 352. The spring 362 may be coupled at an outer end of the spring 362 to the spring recess 356 and at an inner end of the spring 362 to the button 364. While in use, an inner surface of the third cable aperture 365 applies a compressive force on the plug protector 244 providing retention of the cable 240 in addition to the compressive force applied by the clamping mechanism 120 of the cable retention assembly 100. To release the plug protector 244 from the compressive force of the button 364, a force may be applied to the button by a user that overcomes the spring force applied by the spring 362 on the button 364.

Figure 5:
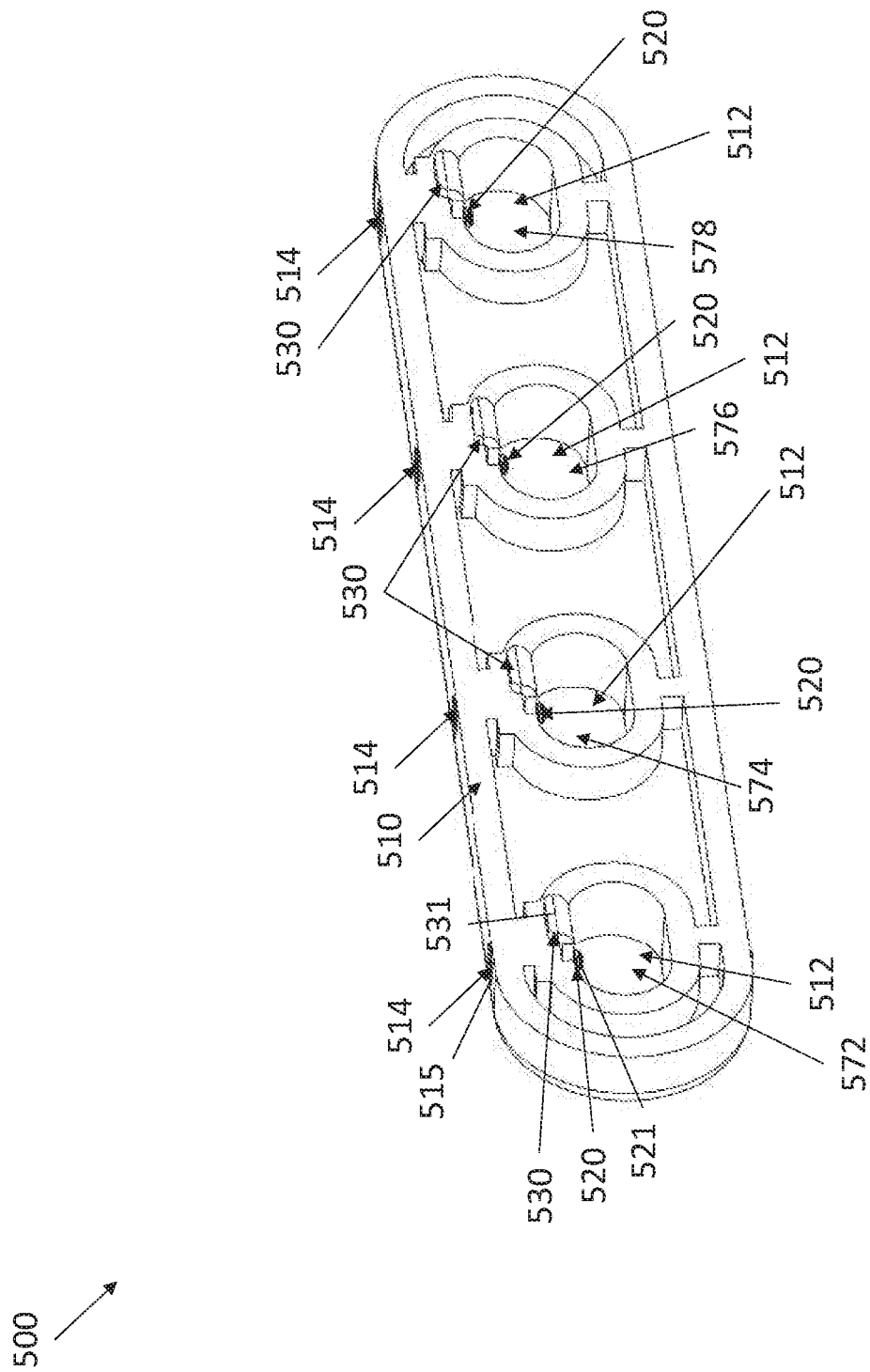
FIG. 5 illustrates a perspective view of a cable retention assembly, in accordance with various embodiments.

Referring now to FIG. 5, a perspective view of a cable retention assembly 500 in accordance with various embodiments, is depicted. The cable retention assembly 500 comprises a housing 510 defining a first plurality of cable apertures 512, a plurality of clamping mechanisms 520 and a plurality of hooks 530. In various embodiments, the first plurality of cable apertures 512 comprise a first cable aperture 572, a second cable aperture 574, a third cable aperture 576 and/or a fourth cable aperture 578. The first cable aperture 572 is disposed at a first end of the housing 510. The second cable aperture 574 is disposed adjacent to the first cable aperture 572. The third cable aperture 576 is disposed adjacent to the second cable aperture 574. The fourth cable aperture 578 may be disposed at a second end of the housing 510 and is adjacent to the third cable aperture 576. Each cable aperture in the first plurality of cable apertures 512 extends axially through the housing 510. Each cable aperture in the first plurality of cable apertures 512 may contain the same features as the first cable aperture 112 in the cable retention assembly 100 described above. The housing 510 may further define a plurality of retention apertures 514, each retention aperture in the plurality of retention apertures 514 corresponding to a respective cable aperture in the first plurality of cable apertures 512. Similarly, each clamping mechanism in the plurality of clamping mechanisms 520 corresponds to a respective cable aperture in the first plurality of cable apertures 512, and each hook in the plurality of hooks 530 corresponds to a respective cable aperture in the first plurality of cable apertures 512.

For example, with reference to the first cable aperture 572 in the first plurality of cable apertures 512, a first retention aperture 515 extends from an outer surface of the housing 510 through the housing 510 and opens into the first cable aperture 572. A first hook 531 in the plurality of hooks 530 is coupled to the housing 510 via a first clamping mechanism 521 in the plurality of clamping mechanisms 520. Each clamping mechanism in the plurality of clamping mechanisms 520 may contain the same features as the clamping mechanism 120 as described above. The first clamping mechanism 521 extends through the first retention aperture 515 and into the first cable aperture 572.

Figure 6:
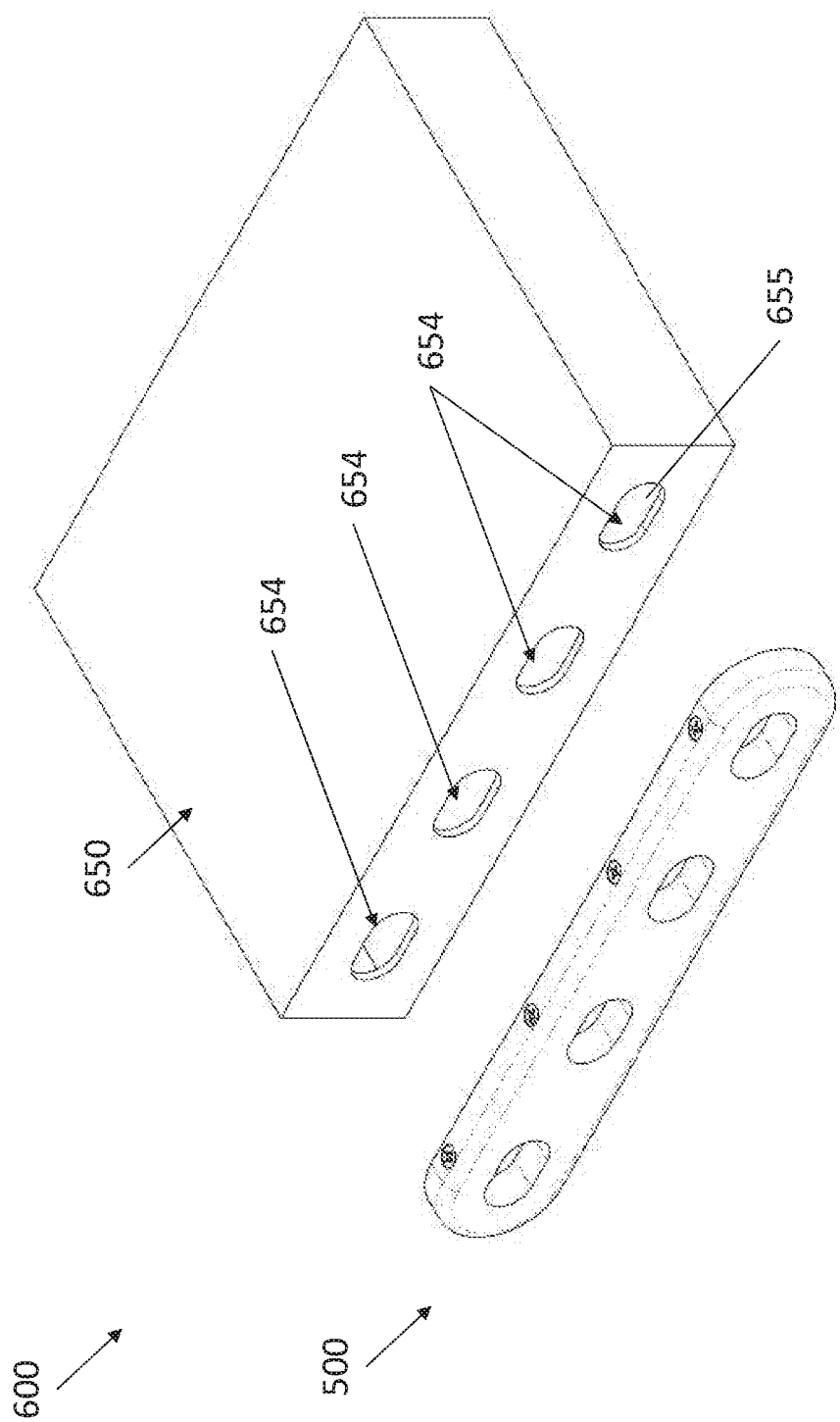
FIG. 6 illustrates a perspective view of a cable retention system, in accordance with various embodiments.

Referring now to FIG. 6, an exploded view of a cable retention system 600 in accordance with various embodiments, is depicted. The cable retention system 600 comprises a cable retention assembly 500 and a hub 650. The hub 650 defines a second plurality of cable apertures 654 disposed in a front side surface of the hub 650. Each cable aperture in the second plurality of cable apertures 654 are disposed adjacent to an adjacent cable aperture in the second plurality of cable apertures 654. Referring now to FIGS. 5 and 6, each cable aperture in the second plurality of cable apertures 654 corresponds to a respective cable aperture in the first plurality of cable apertures 512 from the housing 510. For example, the first cable aperture 655 in the second plurality of cable apertures 654 aligns with the first cable aperture 572 in the first plurality of cable apertures 512. The first cable aperture 655 in the second plurality of cable apertures 654 is also coupled to the cable retention assembly 500 via the first hook 531 in the plurality of hooks 530 engaging a hook recess in first cable aperture 655 of the hub 650. The hub 650 may have the same features described with regard to the connector 350 at each aperture location in the second plurality of cable apertures 654.

The cable retention system 600 may allow multiple cables to be retained simultaneously. This could be beneficial for any device requiring multiple cable inputs, such as a docking station, a cable box, a computer, an adapter with multiple ports, and/or any other hub for cables known in the art.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cable retention assembly comprising:
   a housing defining a cable aperture extending axially through the housing and a retention aperture extending from an outside surface of the housing through the housing and opening into the cable aperture;
   a clamping mechanism disposed at least partially within the retention aperture; and
   a hook having an insert and a lip, the hook coupled to the housing via the clamping mechanism, wherein the lip of the hook extends axially aft of the housing.

2. The cable retention assembly of claim 1, wherein the clamping mechanism further comprises a fastener, wherein a portion of the fastener extends into a portion of the cable aperture.

3. The cable retention assembly of claim 2, wherein the housing further defines a groove extending axially through the housing adjacent to the cable aperture, and wherein the fastener is threadingly coupled to the insert and mates the hook to a hook mating surface of the groove.

4. The cable retention assembly of claim 3, wherein the hook mating surface defines a plane, and wherein a centerline of the retention aperture is substantially perpendicular to the plane.

5. The cable retention assembly of claim 1, wherein the cable retention assembly is coupled to a connector housing via the hook.

6. A cable retention system, comprising:
   a connector comprising a connector housing and a plug port, the connector housing defining a first cable aperture extending axially through the connector housing and a hook recess extending outward into a surface of the first cable aperture; and
   a cable retention assembly coupled to the connector, the cable retention assembly comprising:
      a housing defining a second cable aperture extending axially through the housing and a retention aperture extending from an outside surface of the housing through the housing and opening into the second cable aperture;
      a fastener disposed at least partially within the retention aperture; and
      a hook having an insert and a lip, the hook coupled to the housing via the fastener.

7. The cable retention system of claim 6, wherein the lip of the hook engages the hook recess.

8. The cable retention system of claim 6, further comprising a catch-and-release mechanism disposed within the connector housing, the catch-and-release mechanism comprising a button and a spring, wherein the connector housing further comprises a spring recess disposed axially adjacent to the hook recess, the spring coupled to the spring recess and an outer surface of the button.

9. The cable retention system of claim 8, wherein the connector housing further comprises a button receptacle disposed opposite the spring recess, the button extending through the button receptacle, wherein a portion of the button extends outside the connector housing.

10. The cable retention system of claim 6, wherein a portion of the fastener extends into a portion of the second cable aperture.

11. The cable retention system of claim 10, wherein the housing further defines a groove extending axially through the housing adjacent to the second cable aperture, and wherein the fastener is threadingly coupled to the insert and mates the hook to a hook mating surface of the groove.

12. The cable retention system of claim 11, wherein the first cable aperture and the second cable aperture are co-axial.

13. The cable retention system of claim 6, further comprising a cable having a plug and extending through the first cable aperture and the second cable aperture, the plug coupled to the plug port, and the cable retained by the fastener exerting a force on a portion of the cable.

14. A cable retention system comprising:
   a cable retention assembly comprising:
      a housing defining a first plurality of cable apertures and a plurality of retention apertures, each cable aperture in the first plurality of cable apertures extending axially through the housing, and each retention aperture in the plurality of retention apertures extending from an outside surface of the housing through the housing and opening into a respective cable aperture in the first plurality of cable apertures;
      a plurality of fasteners, each fastener in the plurality of fasteners disposed at least partially within a respective retention aperture in the plurality of retention apertures; and
      a plurality of hooks, each hook in the plurality of hooks having an insert and a lip, and each hook in the plurality of hooks coupled to the housing via the insert and a respective fastener in the plurality of fasteners, the lip of each hook in the plurality of hooks configured to engage a hook recess disposed in an inner surface of a second cable aperture of a hub, the hub configured to be disposed adjacent to the housing.

15. The cable retention system of claim 14, wherein each cable aperture in the first plurality of cable apertures is disposed adjacent to an adjacent cable aperture in the first plurality of cable apertures.

16. The cable retention system of claim 14, wherein a portion of each fastener in the plurality of fasteners extends into a portion of each respective cable aperture in the first plurality of cable apertures.

* * * * *